Jan. 1, 1952     G. SPATTA     2,581,152
AUTOMOTIVE DRIVE
Filed March 6, 1948     2 SHEETS—SHEET 1
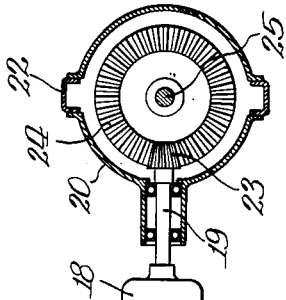
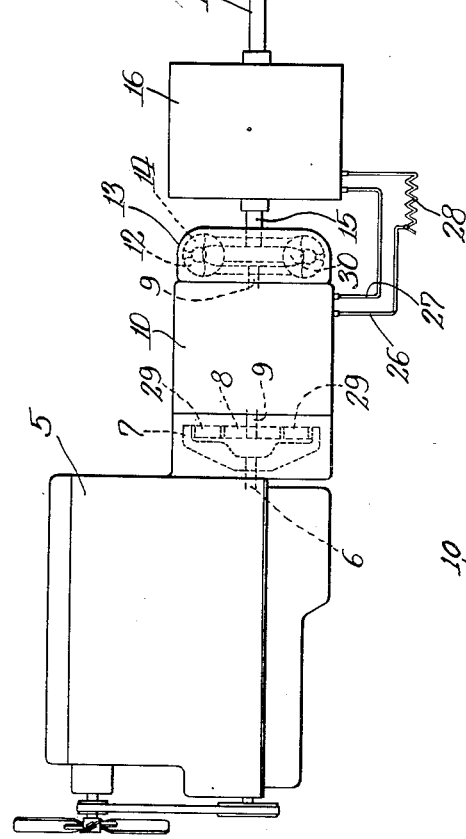
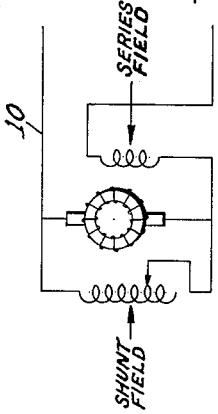
INVENTOR.
George Spatta,
BY Walter E. Schirmer
Atty.

Patented Jan. 1, 1952

2,581,152

UNITED STATES PATENT OFFICE 2,581,152

AUTOMOTIVE DRIVE

George Spatta, Buchanan, Mich., assignor to Clark Equipment Company, Buchanan, Mich., a corporation of Michigan Application March 6, 1948, Serial No. 13,441

5 Claims. (Cl. 290—14)

1

This invention relates to an automotive drive and method, and more particularly is concerned with means for driving vehicles such as trucks and buses utilizing both electric and mechanical power means for applying torque to the drive axle, the mechanical application of the torque being through a fluid torque transmitting member. This member is preferably a three element torque converter of known type which changes automatically into a hydraulic coupling.

There have been several attempts made to provide a drive for vehicles of what might be called the "electro-gear" type, in which the driving shaft is actuated by means of an electric motor receiving its power from a generator driven by the prime mover or engine, and exerting this power by means of torque on the drive shaft through planetary gearing or the like. However, such schemes have not proved satisfactory, since an electric motor capable of developing high starting torque does not operate efficiently at high vehicle speeds, as its torque and efficiency both decrease as the speed of the motor increases.

Attempts have also been made to provide a drive in which such an electro gear has been combined with a friction or positive clutch between the engine shaft and the propeller shaft to provide a direct drive after the vehicle has been accelerated. Overlap of torque of the two drives on starting is impossible, for the reason that the engine does not develop its full power or torque except at high speed, and the electric drive tends to produce its maximum torque at low speed of the propeller shaft. Hence, it is impossible in such a system to combine the torque of the electric traction drive with torque through a mechanical clutch, whether it be a friction clutch or a jaw clutch, to provide the well known requirement of maximum torque for accelerating a vehicle from standstill to the desired cruising speed.

I am aware that it has been proposed to provide a vehicle drive consisting of an electric generator and an electric motor between the engine shaft and the propeller shaft for accelerating the vehicle to minimum cruising speed, and a clutch of either the friction type or the jaw type for coupling the two shafts together. Such electric drives become unduly large and heavy because the entire engine power is required to be transmitted through them throughout their operative speed range. On busses the employment of a fluid coupling, particularly in traffic, has been found to be highly desirable to avoid the bucking effect of a heavy load when the engine is throttled down.

2

The present invention, on the other hand, contemplates an engine which is adapted to drive either directly or through gears which may be stepup or reversing gears or both, a generator for developing electric power, which generator is coupled to an electric motor or propeller shaft. However, in addition, the engine, either directly or through gears, simultaneously drives a fluid torque converter so that the application of torque to the propeller shaft is provided by both the torque converter and the electric motor. Thus, very high starting and accelerating torque is provided. However, as the vehicle speed increases to a point where the electric motor loses its high torque and efficiency, the motor is manually or automatically cut out and the torque converter functions at this time as a fluid or hydraulic coupling to provide a direct driving connection between the engine and the propeller shaft through the hydraulic fluid medium in the coupling, thereby providing a highly efficient direct drive without the decreasing torque characteristics of the electric motor producing any undesirable effect on the drive shaft.

It will be understood that in an electric drive, it is customary to provide a generator of the compound wound type in which the shunt wound characteristic is dominant, i. e., it tends to give a fairly even voltage over a fairly wide range of output. The motor, on the other hand, is usually of the compound wound type in which the series wound characteristics is predominant, i. e., it tends to require high amperage and give high torque at low speeds, and as it speeds up, its counter electromotive force increases and the amperage and torque diminish.

My system provides a means for supplementing the torque of an electric drive of the above type with the simultaneously operating torque converter or hydraulic coupling during acceleration which takes the entire torque load of the vehicle on attaining cruising speed.

It is therefore one object of the present invention to provide both an electrical and fluid driving medium for the propeller shaft of the vehicle during starting and bringing of the vehicle up to cruising speed, with the electric motor being de-energized at this point and the torque converter operating as a fluid coupling to provide direct drive after this predetermined speed has been reached.

Another advantage produced by the present invention is that by reversing the current flow to the motor, it can be used for regenerative braking of the power shaft upon operation of a brake control lever or the like, thereby providing a decelerating or retarding effect upon the propeller shaft, which is in addition to the braking effect that may be produced by the operation of the normal vehicle brakes reacting at the wheels.

The peculiar advantage attainable by my invention is the relatively high torque for low vehicle speeds which the electric system can attain at high efficiency supplemented by an overlap of torque attainable by the hydraulic element which, however, shows its better efficiencies only as the speeds of the two shafts are both fairly high and approach each other. By the operation of both driving mechanisms simultaneously, a higher rate of acceleration is possible. A smooth discontinuance of the electric drive is possible, since the drive of the hydraulic connection is effective before the electric connection is discontinued, and it becomes the sole drive after minimum cruising speed is attained, and the electric drive is discontinued. Smaller size elements may be employed in my drive, and the efficiency is improved, particularly at the lower speeds at high torque. The greater smoothness of a hydraulic drive, particularly in the cruising range is attained. This is particularly important for buses. The design of the combination drive is such that the converter need not be capable of accelerating the vehicle from standstill under the rated load of the vehicle to minimum cruising speed, but can readily carry the torque of the load after minimum cruising speed is attained. The electric drive on the contrary provides a high additional starting torque which rapidly drops off as the vehicle is accelerated.

This application is a continuation-in-part of application Serial No. 549,703, filed August 16, 1944, which application has now become abandoned.

Other objects and advantages of this invention will appear more fully from the following detailed description which, taken in conjunction with the accompanying drawings, will disclose to those skilled in the art the particular construction and operation of a preferred form of the present invention.

In the drawings:

Figure 1 is a more or less diagrammatic layout of a power train of a vehicle constructed in accordance with the present invention.

Figure 3 is a diagram of a compound wound generator, such as is preferably used in the present invention;

Figure 4 is illustration of a direct coupling between the shafts 6 and 9 of Figure 1; and Figure 5 is a diagram of a compound wound motor such as is preferably employed in the present invention.

Figure 2:
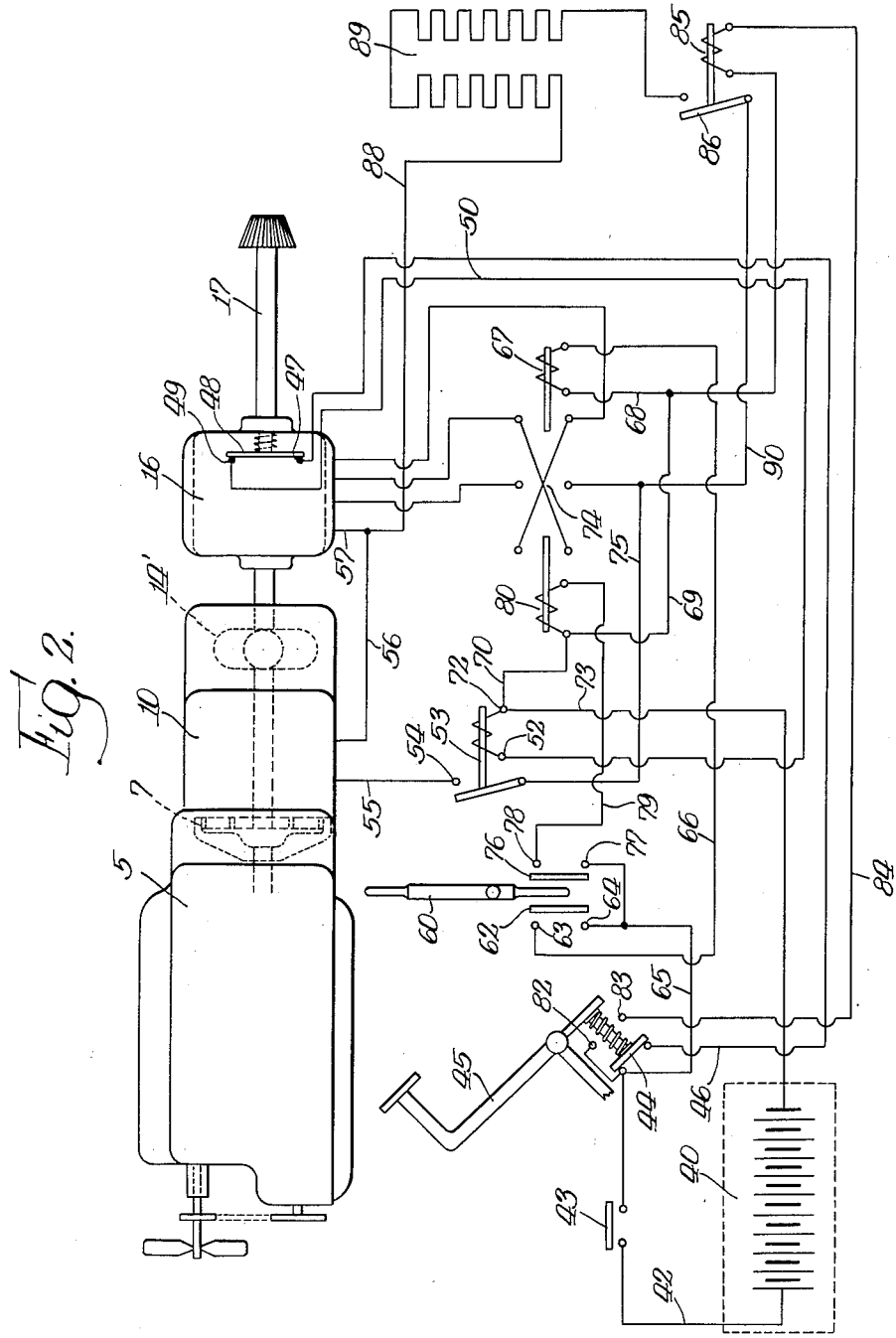
Figure 2 is a corresponding view with the details of the electric control circuit.

Referring now in detail to Figure 1 of the drawings, I have indicated an internal combustion engine or other similar type of prime mover 5 which has its crankshaft 6 connected to the ring gear 7 of a stepup gear train, the sun gear 8 of which is connected to the shaft 9 of a generator 10.

This showing of a stepup gear is diagrammatic. Any known or suitable arrangement of stepup gear may be utilized. The gears 29 may, for example, be meshed pairs between the ring gear 7 and the sun gear 8. In that event the drive, either direct or stepup, is in the same direction.

The shaft 9 carries the generator armature and extends through the generator housing, and at its opposite end is coupled to the impeller member 12 of a three element fluid torque converter indicated generally at 13, the torque converter having the rotor or turbine element 14 connected to the output shaft 15. The generator is preferably of the compound wound type as illustrated in Figure 3 suitable for traction drive purposes.

The output shaft 15 extends through the motor housing 16, and carries the armature of the motor. This same shaft is extended outwardly of the motor housing 16 to form the propeller shaft 17 which, through the universal coupling 18, is connected to the pinion shaft 19 disposed within the differential carrier 20 mounted on the banjo portion 22 of a rear axle housing. The pinion shaft 19 has a pinion 23 in driving engagement with the ring gear 24 of a differential having opposite extending axle shafts 25. The generator is connected to the motor 16 through the electrical conductors 26 and 27, the conductor 26 having a variable resistance 28 interposed therein for controlling the motor speed. Preferably a pole changer reversing switch 74 is provided in circuit 26—27 as illustrated in Fig. 2.

The general arrangement of conductors indicated at 26, 27 and resistance 28 of Figure 1, is illustrated in detail in Figure 2, wherein conductors 55, 56 correspond in general to conductors 26 and 27 of Figure 1, and resistance 89 of Figure 2 corresponds to resistance 28 of Figure 1.

In the operation of the drive, as illustrated in this figure, the engine 5 is adapted to drive the ring gear 7 which, through the stationary gears 29, drives the sun gear 8 at a greater rate of speed, thereby driving the generator 10 to produce electric current. This current is transmitted to the motor 16 through the conductors 26 and 27, thereby imposing driving torque on the armature of the motor carried by the shaft 17. Alternatively, shaft 9 may be driven at the same speed as the driving shaft 6 of the engine by a direct coupling as illustrated in Figure 4. The D. C. motor is of the traction type and has the characteristic of very high starting torque, and consequently a heavy starting torque is applied to the shaft 17 for initiating movement of the vehicle. Simultaneously, the fluid coupling 13 is also driven from the sun gear 8, and through the fluid medium therein, transmits driving torque at a greater than one to one ratio to the rotor 14 for also applying driving torque to the shaft 17. However, the starting torque of the electric motor is much greater and more efficiently produced than the initial starting torque of the torque converter, and consequently, the initial movement of the vehicle is produced almost entirely by the motor 16. However, as the torque converter speeds up, its torque increases rapidly, while the torque of the electric motor 16 begins to decrease.

This dual drive proceeds until minimum cruising speed is reached. Here the hydraulic connection has become sufficiently effective to carry the major part of the torque and is ready to cut over from a torque converter to a hydraulic coupling or liquid clutch holding the two shafts together at substantially a one to one ratio. At this point, i. e., minimum cruising speed, the engine is throttled momentarily, the electric system disconnected, and the engine which is now coupled directly to the propeller shaft through the hydraulic coupling, has sufficient torque to carry the load. The shift from dual drive to hydraulic drive alone may be made automatically if desired, as hereinafter explained.

Suitable control means is provided for opening the circuit between the generator 10 and the motor 16, whereby further driving torque is imposed on the shaft 17 solely by the torque converter 13. As the vehicle reaches its cruising speed, the one-way clutch, of more or less standard design, upon which the third element or stator 30 of the torque converter is mounted, allows the stator to start moving forwardly with the impeller and rotor, whereby the torque converter changes its character to that of a fluid coupling, and a direct fluid drive is therefore provided between the engine and the propeller shaft. The control features of the present construction can be widely varied without in any way affecting the overall operation of the device as described, and various types of standard control mechanisms now on the market can be used for effecting the acceleration of the motor 16 through field control, with or without the resistance 28, and also for cutting out the motor 16 at a predetermined point, thereby letting the torque converter 13 and the fluid coupling formed thereby to assume the entire driving torque in the higher speed range of the vehicle.

When it is desired to effect deceleration of the vehicle, a control switch 60 can be operated simultaneously with the conventional vehicle brakes to produce regenerative braking of the motor 16 upon the generator 10 or upon a resistance, thereby applying a retarding force to the propeller shaft to supplement the action of the conventional type of brakes, thereby reducing the size of the conventional brakes by the amount of braking effort that can be produced in the generator.

Considering now the more detailed arrangement disclosed in Figure 2 of the drawings, the engine 5, either directly or through the planetary stepup gear arrangement 7, drives the D. C. generator 10 in the manner described in connection with Figure 1. The circuit for the generator, however, is considerably more detailed than has been disclosed in Figure 1 for controlling the operation of the motor 16 which drives the propeller shaft 17, the fluid torque converter or coupling 14' being interposed therebetween.

The generator 10 is preferably of the well known compound wound type shown in Figure 3 to hold up its voltage as the current flow therethrough increases. The motor 16 is preferably of the series wound type, but may have a shunt type winding, as shown in Figure 5, for assisting in regenerative braking. Such units are well known in electric transmissions and per se are not my invention.

Considering the motor circuit in detail, this circuit can be controlled from the battery voltage of the storage battery of the vehicle, indicated generally at 40. The battery 40 has one line 42 going through the ignition switch 43 and through a brake controlled switch 44, whereby the circuit to the generator is broken whenever the brake pedal 45 is actuated. From the brake switch 44, current is conducted through the line 46 to one terminal 47 of a speed-responsive switch member 48 driven from the motor shaft of the motor 16. The speed-responsive switch may be of the centrifugal type set to open at a predetermined speed, such as 20 M. P. H.

The opposite terminal 49 of the centrifugal switch leads back through the conductor 50 to the terminal 52 of a relay contactor 53, the contactor 53 being normally closed to complete a circuit from contact 54 through conductor 55 to one side of the generator. The opposite side of the generator, indicated by the conductor 56, is connected into the motor circuit through the conductor 57.

In order to control the direction of rotation of the motor 16, there is provided a forward and reverse control lever 60, which is shown in Figure 2 in neutral position. When actuated in one direction, the lever 60 is adapted to close the switch 62 between contacts 63 and 64. This completes the circuit from the conductor 65 leading from the brake switch through conductor 66 to the solenoid 67 and from this solenoid back through conductor 68, line 69 and line 70 to the opposite terminal 72 of the main contact switch 53. From the terminal 72 the circuit returns to the battery through conductor 73. Assuming that the solenoid 67 is the forward drive solenoid, this results in pulling the reversing switch 74 into position to connect the field coils of the motor 16 in the proper position through the conductor 74 and contactor 53 to the generator power line 55. When the forward and reverse lever 60 is moved in the opposite direction, it effects closing of the reverse switch 76, which in turn connects the conductor 65 through contact 77 to contact 78, and thence through conductor 69 to the opposite solenoid 80 of the reversing switch, thereby connecting the motor circuit field coils for reverse operation of the motor.

It will be apparent, therefore, that for driving the motor 16 from the generator 10, it is necessary, first, that the brake pedal be in the position shown in Figure 2 and that the forward or reverse lever 60 be in one or the other of its actuated positions, depending upon which direction of drive is desired.

When the vehicle reaches a predetermined speed, the centrifugal speed-responsive switch will open the circuit between the contacts 47 and 49, thereby opening the circuit through the contactor 53, de-energizing the generator circuit. From this time on the generator and motor will act merely as flywheels during the driving of the vehicle, and the torque will be transmitted through the fluid coupling or torque converter 14'.

Instead of waiting for the automatic cutting out of the electric drive to throw the load upon the hydraulic drive connection, the operator may, upon observing on the vehicle speedometer, throttle the engine momentarily to reduce or stop the power transmitted through the electric drive and move the lever 60 to neutral position to open the circuit at the reversing switch. Then, upon opening the throttle, the engine picks up the load through the hydraulic connection 14', which thereupon operates as a hydraulic coupling, that is, on a substantially one to one drive. After passing the cutout speed where the centrifugal switch 48 opens, the operator may move the lever 60 to forward drive position to prepare the motor circuit for braking through the resistance 89.

Upon movement of the brake pedal 45 toward brake actuating position, the entire circuit is opened. However, after initial movement of the brake pedal, the circuit can be re-established through the brake pedal switch 44 from contact 82 to contact 83 leading through conductor 84 to a secondary contactor 85 which operates to close the switch 86, providing a connection from one side of the motor circuit through conductor 67 and conductor 88 to a series of resistors 89, thence through the switch 86 and back through conductor 90 into the motor circuit. Under these conditions, the motor acts as a generator and produces regenerative braking of the motor armature. The heat accumulated in the resistors 89 by reason of this can be dissipated to atmosphere, or can be used for heating the cab or body of the vehicle when the drive is used in connection with buses or trucks. This will provide a high degree of braking effort to decelerate the shaft 17 in addition to the normal brake application at the wheels of the vehicle, and will therefore relieve the braking effort necessary at the wheels by the amount of effort produced from the regenerative braking through the motor 16.

It is therefore apparent that the present construction lends itself admirably to the provision of a drive having a very high starting torque, and which can be used for either forward or reverse drive without requiring any reverse gearing such as is now necessary, the electric driving having ample torque at low speeds. In addition, the added advantage of the regenerative braking effort produced with a drive of this type is of extreme importance.

The method of driving the vehicle according to my invention involves the simultaneous drive of the propeller shaft through both the electric traction type connection and the hydraulic torque converter connection. The electric drive is for low speeds of the propeller shaft, more efficient than that of the hydraulic drive. The internal combustion engine must operate at relatively high speed to develop its maximum power. It is to be noted that the point of maximum torque of the engine has no relevance in this connection.

By operating the engine at high speed to develop high power output, the electric generator can be caused to develop high voltage. This voltage operating on the series type motor produces high amperage, and the torque is proportional to amperage. As soon as the motor begins to speed up, it produces a counter-electromotive force which opposes that of the generator and less amperage flows. That in turn reduces the torque. As the propeller shaft comes up to speed the electric motor as per its design begins to lose torque to the point that it cannot carry the torque of the load and the speed remains the same. Obviously, by auxiliary controls and windings, the electric drive can be made to exert torque at minimum cruising speed or higher, but this involves difficulties in design and in auxiliary equipment, which my present invention avoids.

Now while the above described operation of the electric drive is proceeding, the torque converter is doing its part of the work of bringing the vehicle up to speed. The hydraulic torque converter is not efficient, particularly at low speeds of the driven shaft and its effectiveness tends to increase as the speed of the vehicle increases. The design of the unit is such that when the vehicle is operating at minimum cruising speed, the driven element is operating at such speed that if the power shaft speed be dropped to about that of the driven shaft, the third element which is mounted to rotate forward but not backward will drop in step with the impeller and the device becomes a hydraulic two element coupling, the reaction of the liquid through the said third element being less than the drag forward. The conversion of the torque converter to a hydraulic coupling may occur without throttling the engine, but obviously it is preferable to throttle down the engine momentarily to simplify disconnection of the electric system. Then the throttle may be opened, and the engine picks up the load driving through the hydraulic coupling alone.

When the vehicle comes to minimum cruising speed, which is about 20 M. P. H., the operator partially closes the throttle which has been well open before, and the engine speed tends to drop down. This takes the load off the electric drive, and the circuit between the generator and motor can readily be opened without being under any electric load. In other words, the circuit may be opened when there is no substantial current flowing.

Then the operator opens the throttle and the hydraulic connection operating as a hydraulic coupling connects the shafts at a substantially one to one ratio. Driving at cruising speeds proceeds from there on.

The drive of my invention is advantageous from the standpoint of the relatively smaller diameters of the units which may be employed, and particularly the hydraulic unit. For a torque converter of a capacity great enough to convert the power of a large engine to a heavy vehicle, the diameter becomes embarassingly large. Since the front engine drive requires the torque converter to be disposed in the line of the drive to the rear, the converter cannot be increased in diameter unduly without conflicting with controlling factors of design. A hydraulic clutch or coupling operating at fairly high speed will satisfactorily transmit a given amount of power requiring less diameter than that which a torque converter requires for converting the same amount of power into standstill torque. Thus by supplementing the torque conversion function by means of the electric drive, the hydraulic unit may be made of substantially smaller diameter. At the same time the electric drive need not be of a capacity or size which would be required to develop the entire amount of torque required for acceleration of the vehicle.

The torque of the electric motor at low speeds is ample, even against the resistance of the hydraulic connection, to drive the vehicle in reverse direction. High speed in reverse direction is not desirable in a heavy vehicle.

There is no bucking of the vehicle in case the throttle is closed down at any stage of operation of the transmission because the drive does not rely upon a positive mechanical connection between the rear axle and the engine, but includes either the fluid connection or the electro-magnetic connection or both. This is particularly important in buses where standing passengers tend constantly to be pitched forward in case the operator lifts his foot from the accelerator where a mechanical drive is employed.

I am aware that various changes may be made in certain details of the present construction and the control circuit therefor, and I therefore do not intend to be limited except as defined by the scope and spirit of the appended claims.

I claim:

1. An automotive vehicle drive comprising a driving shaft adapted to be driven by an internal combustion engine, a propeller shaft for driving the vehicle, an electric generator-motor drive between said shafts, a hydraulic torque converter drive between said shafts said drive including a three element converter which at lower vehicle speeds drives at more than a one to one torque transmission ratio and at higher vehicle speeds drives at substantially a one to one torque transmission ratio, said electric drive having high standstill torque but insufficient torque alone to accelerate the vehicle to substantially minimum cruising speed and the hydraulic drive having insufficient torque to accelerate the vehicle from standstill at rated load, but providing sufficient torque to propel the vehicle at and above minimum cruising speed, both said drives being operative for acceleration of the vehicle to minimum cruising speed, and means for disconnecting the electric drive without disconnecting the hydraulic drive when the vehicle attains said minimum cruising speed.

2. An automotive drive for a vehicle comprising an engine, an axle, a propeller shaft for driving said axle, a generator, a fluid torque converter having at low vehicle speeds a torque transmission ratio greater than one to one, and at and above normal cruising speeds a torque transmission ratio of substantially one to one, said converter having insufficient torque capacity to accelerate the vehicle under rated load from standstill to minimum cruising speed, means operated by said engine for simultaneously driving said generator and converter, an electric motor on said shaft and adapted to be driven from said generator, said converter having its output shaft connected to said propeller shaft whereby said converter and motor simultaneously apply torque to said shaft, said generator-motor drive delivering high standstill torque but delivering insufficient torque to propel the vehicle at or above minimum cruising speed, and means for cutting out said motor when said propeller shaft rotates above a predetermined speed corresponding to minimum cruising speed.

3. An automotive drive for a vehicle comprising an engine, an axle, a propeller shaft for driving said axle, a generator, a fluid torque converter having at low vehicle speeds a torque transmission ratio greater than one to one, and at and above normal cruising speeds a torque transmission ratio of substantially one to one, said device delivering insufficient torque to accelerate the vehicle under rated load from standstill to minimum cruising speed, means on said engine for simultaneously driving said generator and converter, an electric motor on said shaft and adapted to be driven from said generator, said converter having its output shaft connected to said propeller shaft whereby said converter and motor simultaneously apply torque to said shaft, said motor and said device operating simultaneously to drive the propeller shaft from standstill to minimum cruising speed of the vehicle, and means responsive to the speed of said propeller shaft for interrupting the connection between said generator and motor at substantially the minimum cruising speed of the vehicle.

4. In combination for a vehicle drive, a power activated driving shaft, a driven vehicle propelling shaft, a fluid drive connection between said shafts providing a coupling having limited torque upon standstill of the vehicle, said fluid drive connection comprising driving, driven and an intermediate member constituting a torque converter having a torque transmission ratio in excess of one to one when the vehicle is operating below a predetermined vehicle speed and consituting a fluid coupling having a torque transmission ratio of substantially one to one at vehicle speeds above said predetermined speed a generator having an armature connected to said driving shaft, a motor adapted to be connected to said generator and having an armature connected to said driven shaft, said motor providing a high starting torque upon standstill of the vehicle, said motor delivering insufficient torque to drive the vehicle above minimum cruising speed, both the fluid drive and the electric motor drive being operative to transmit torque for accelerating the vehicle from standstill to substantially minimum cruising speed, and means for deactivating the electric motor drive when the vehicle attains substantially minimum cruising speed.

5. An automotive vehicle drive comprising a power shaft adapted to be driven by an internal combustion engine, a propeller shaft adapted to drive a driving axle of the vehicle, an electric generator driven by the power shaft, a series type motor connected electrically in series with said generator and connected mechanically to said propeller shaft, a hydraulic drive of the type which operates as a fluid torque converter to apply torque to the propeller shaft at a greater than one to one ratio during acceleration of the vehicle and which automatically becomes a hydraulic coupling for direct drive at and above minimum cruising speed of the vehicle, said generator and motor comprising a driving connection of higher efficiency than that of the fluid drive for relatively low speeds of the vehicle, said fluid drive providing a higher efficiency than that of the electric drive for cruising speeds of the vehicle, both of said drives being adapted to operate to transmit torque when the propeller shaft is moving below cruising speed and the power shaft is driven at a substantially higher speed.

GEORGE SPATTA.

REFERENCES CITED

The following references are of record in the file of this patent:

UNITED STATES PATENTS

| Number | Name | Date |
|---|---|---|
| 948,436 | Thomas | Feb. 8, 1910 |
| 1,301,763 | Thomas | Apr. 22, 1919 |
| 1,655,100 | Jensen | Jan. 3, 1928 |
| 1,664,562 | Jensen | Apr. 3, 1928 |
| 1,671,033 | Kimura | May 22, 1928 |
| 1,769,281 | Zubaty | July 1, 1930 |
| 1,780,150 | Ahlm | Nov. 4, 1930 |
| 1,784,524 | Jensen | Dec. 9, 1930 |
| 1,855,032 | Sinclair | Apr. 19, 1932 |
| 1,980,165 | Burleigh | Nov. 13, 1934 |
| 2,172,298 | Sousedik | Sept. 5, 1939 |
| 2,213,342 | Gossler | Sept. 3, 1940 |
| 2,213,349 | Seibold | Sept. 3, 1940 |
| 2,249,857 | Schaelchlin | July 22, 1941 |
| 2,346,032 | Kinnucan | Apr. 4, 1944 |

FOREIGN PATENTS

| Number | Country | Date |
|---|---|---|
| 472,619 | Great Britain | Oct. 28, 1937 |